United States Patent
Riedl (10) Patent No.: US 10,761,504 B2
(45) Date of Patent: Sep. 1, 2020

(54) METHOD AND SYSTEM FOR MODIFYING AN INDUSTRIAL CONTROL PROGRAM

(71) Applicant: CODESYS Holding GmbH, Kempten (DE)

(72) Inventor: Stefan Riedl, Sulzberg (DE)

(73) Assignee: CODESYS Holding GmbH, Kempten (DE)

( * ) Notice: Subject to any disclaimer, the term of this patent is extended or adjusted under 35 U.S.C. 154(b) by 1 day.

(21) Appl. No.: 16/156,338

(22) Filed: Oct. 10, 2018

(65) Prior Publication Data
US 2019/0121310 A1 Apr. 25, 2019

(30) Foreign Application Priority Data

Oct. 13, 2017 (EP) ..................................... 17196323

(51) Int. Cl.
*G05B 19/042* (2006.01)
*G06F 9/54* (2006.01)
*G06F 8/30* (2018.01)

(52) U.S. Cl.
CPC ..... *G05B 19/0426* (2013.01); *G05B 19/0425* (2013.01); *G06F 8/30* (2013.01); *G06F 9/54* (2013.01); *G06F 9/545* (2013.01); *G05B 2219/23333* (2013.01)

(58) Field of Classification Search
CPC ............ G05B 19/042; G06F 8/30; G06F 9/54
See application file for complete search history.

(56) References Cited

U.S. PATENT DOCUMENTS

| | | | |
|---|---|---|---|
| 9,934,004 B1* | 4/2018 | Pillarisetti | G06F 8/35 |
| 2009/0077532 A1* | 3/2009 | Denney | G06F 9/44589 |
| | | | 717/106 |
| 2012/0036493 A1* | 2/2012 | Moosmann | G05B 9/03 |
| | | | 717/105 |
| 2013/0055369 A1* | 2/2013 | Kumar | H04L 9/3247 |
| | | | 726/7 |
| 2015/0268974 A1* | 9/2015 | Goebel | G06F 21/52 |
| | | | 701/1 |
| 2015/0338835 A1* | 11/2015 | Holler | G06F 21/74 |
| | | | 700/79 |
| 2018/0107615 A1* | 4/2018 | Egi | G06F 13/00 |
| 2018/0239309 A1* | 8/2018 | Tamura | G05B 19/0426 |
| 2018/0329397 A1* | 11/2018 | Izzo | G05B 19/4184 |

* cited by examiner

*Primary Examiner* — Vincent H Tran
(74) *Attorney, Agent, or Firm* — Steven J. Grossman; Grossman, Tucker, Perreault & Pfleger PLLC (57) ABSTRACT

A method for modifying an industrial control program is provided, the industrial control program comprising a first program element having a safety classification and a second program element not having the safety classification. The method comprises: identifying, in program source code of the first program element, a call to the second program element, and generating a modified program source code, comprising replacing, in the program source code, the call to the second program element by an auxiliary program element, the auxiliary program element being compliant with the safety classification.

18 Claims, 6 Drawing Sheets

METHOD AND SYSTEM FOR MODIFYING AN INDUSTRIAL CONTROL PROGRAM

TECHNICAL FIELD

The present disclosure relates to the field of industrial control, and in particular to control programs for industrial equipment that are configured to meet safety requirements.

BACKGROUND

Industrial control programs may run on industrial controllers for real-time control of industrial processors, such as control of machinery or industrial processes. In many applications, industrial control programs are written in a high-level language in a programming environment, are compiled and then stored and run on an industrial controller unit that directly controls an associated machinery or industrial process.

Oftentimes, industrial controllers are employed to control machinery or equipment that need to fulfill safety requirements. For instance, safety requirements are intended to ensure the safety of the personnel operating the machinery. Components of an industrial control environment that pose safety requirements may be a sensor adapted to sense the presence of a human in the vicinity of machinery and trigger a corresponding stop signal, an emergency button, or a door lock system. The use of such safety systems and their properties and technical specifications are sometimes prescribed by law or industry regulation. Safety-relevant components of a machinery for industrial process may need to be certified or pass a certain security classification for them to obtain statutory approval. This translates into corresponding safety and statutory requirements for the industrial control software used in the control of these components. Such an industrial control system may also require certification.

However, in many applications industrial control software comprises both functionalities that require safety certification, and others that do not. For instance, an industrial control software comprise both control of safety features such as safety sensors or door locks that require certification, and an interface for exchanging licensing data with a manufacturer, which does not require a safety certification. If the industrial control software can be decomposed into safety-relevant and safety-irrelevant parts, only the safety-relevant parts need to be assessed and certified. However, safety-irrelevant components or elements of the industrial control software may potentially affect the overall system safety if they are called from within a safety-relevant element. This poses a particular burden on the programmer who writes complex industrial control software.

What is needed is an improved method and system to provide industrial control software that complies with a given safety classification, and in particular avoids undesired backlash of safety-irrelevant elements of the industrial control program on safety-relevant elements.

OVERVIEW OF THE INVENTION

This objective is achieved with a method and system for modifying an industrial control program according to independent claims 1 and 11, respectively. The dependent claims relate to preferred embodiments.

According to a first aspect, the disclosure relates to a method for modifying an industrial control program, the industrial control program comprising a first program element having assigned a safety classification and a second program element not having assigned the safety classification, the method comprising the steps of identifying, in program source code of the first program element, a call to the second program element, and generating a modified program source code, comprising replacing, in the program source code, the call to the second program element by an auxiliary program element, the auxiliary program element being compliant with the safety classification.

The method according to the invention may avoid the critical situation that may arise if program source code of a first program element having the safety classification, advertently or inadvertently, calls a second program element that does not have the safety classification. Execution of the second program element may, in these configurations, jeopardize the safety classification of the first program element, and hence the entire industrial control program.

The method according to the first aspect may address these concerns by automatically identifying, in the program source code of the first program element having the safety classification, a call to the second program element not having the safety classification, and automatically generating a modified program source code that mitigates the safety risks associated with the second program element by replacing it effectively with an auxiliary program element compliant with the safety classification.

The techniques of the present disclosure may hence guarantee that the safety classification is upheld and respected under all circumstances, and may compensate efficiently for errors that the programmer have made when mixing safety-relevant and safety-irrelevant program elements. The techniques of the present disclosure may particularly benefit inexperienced programmers and help them to design complex industrial control software without the risk of jeopardizing the safety requirements.

Given that the techniques according to the present invention may effectively rule out the risk of jeopardizing the overall safety classification, the outcome is an industrial control program that has the required safety classification, as required by law, government or industry regulation.

The method may be a computer-implemented method. In particular, the method may be implemented to automatically run on an industrial control system, in particular on a compiler unit.

In the context of the present disclosure, the safety classification may relate to the safety requirement of an industrial control process controlled by the industrial control program, and may in particular relate to a safety certificate.

The safety classification may be defined or characterized in terms of a number of properties, characteristics or requirements of the program elements, which may distinguish the program elements having the safety classification from other program elements not having the safety classification.

In general, the industrial control program may comprise a plurality of first program elements having the safety classification and a plurality of second program elements not having the safety classification. The property of having or not having the safety classification may divide the totality of program elements of the industrial control program into two complementary, disjoint sets.

The industrial control program may be an industrial control source program, or a portion thereof, in particular an industrial control source program in a high-level programming language.

The first program element and/or the second program element and/or the auxiliary program element may comprise a program organization unit and/or a data element.

A program organization unit, in the sense of the present disclosure, may comprise a program portion and/or a function block and/or a function.

A data element may comprise global and/or local data and/or user-defined dated types, such as structures. The data element may comprise a data write instruction and/or a data read instruction.

In the context of the present disclosure, data pertaining to a first program element having the safety classification and data pertaining to a second program element not having the safety classification may be allocated to different and/or spatially separate first and second memory areas, respectively. This may assist to avoid an unwanted backlash of the second program element not having the safety classification on certified data.

In particular, in an embodiment, the first program element comprises a first data element, and the second program element comprises a second data element, wherein the first data element relates to data allocated to a first memory area and the second data element relates to data allocated to a second memory area, wherein the second memory area is different and/or spatially separated from the first memory area.

According to an embodiment, the auxiliary program element comprises instructions for preventing or delaying or modifying an execution on the second program element.

The auxiliary program element may thereby prevent or delay a potential backlash of the second program element not having the safety classification on the first program element having the safety classification.

According to an embodiment, the auxiliary program element may comprise instructions for triggering measures to make an execution of the second program element compliant with the safety classification.

Hence, the techniques according to the present invention may not necessarily prevent an execution of the second program element, and may ultimately allow the second program element to execute, but in an environment that protects the safety classification of the industrial control program.

In particular, the auxiliary program element may comprise instructions for preventing or delaying or modifying a call to the second program element until measures are effected to make an execution of the second program element compliant with the safety classification.

The measures, in the sense of the present disclosure, may be understood to comprise any instructions triggered by the auxiliary program element that affect the industrial control program, the industrial controller, and/or the industrial control environment so to effectively mitigate the effects that the second program element may have on the safety classification.

According to an example, the auxiliary program element comprises instructions for triggering measures to make an execution of the second program element compliant with the safety classification, and further comprises instructions for calling the second program element after the measures are effected.

Once the second program element has been executed in a safety-compliant environment, the measures may be removed or reverted so as to proceed with the instructions according to the first program element having the safety classification.

Hence, in an embodiment, the auxiliary program element comprises instructions for removing the measures after the second program element has been executed.

The auxiliary program may be implemented by means of a wrapper function that wraps the call to the second program element in the program source code of the first program element.

Hence, according to an embodiment, generating the modified program source code comprises replacing the call to the second program element by a wrapper function, the wrapper function being adapted to call the auxiliary program element.

In an embodiment, the auxiliary program element comprises instructions for a memory protection, in particular a memory lock.

The memory lock may be adapted to lock memory in a first memory area, wherein the first memory area may be exclusive to program elements having the safety classification.

The memory lock can be an effective means for avoiding interference of the second program element with safety-relevant data pertaining to the first program element having the safety classification, and being stored in the locked first memory area.

The memory lock may be a software memory lock or a hardware memory lock, or a combination of a software memory lock and a hardware memory lock.

According to an example, the auxiliary program element may comprise instructions for delaying an execution of the second program element until after the memory protection is effected.

Alternatively or additionally, the auxiliary program element may comprise instructions for a memory analysis, in particular a memory analysis of a memory area exclusive to program elements having the safety classification.

A memory analysis may allow to detect whether memory operations attributed to the second program element may have affected safety-relevant data pertaining to the first program element.

For instance, the memory analysis may comprise a check sum analysis.

The auxiliary program element may then allow to trigger countermeasures that prevent detrimental effects for the system safety that could ensue if the industrial control program were executed with the distorted memory.

According to an example, the auxiliary program element comprises instructions for switching an industrial control process controlled by the industrial control program to a default state in response to the memory analysis, in particular in case the memory analysis yields that data in the memory area exclusive to program elements having the safety classification has been modified as a consequence of the call to the second program element.

Alternatively or additionally, the auxiliary program element may comprise instructions for delegating an execution of the second program element to a separate task, in particular to a task having the safety classification or associated memory.

The separate task may provide a secure environment in which the second program element may be executed without an effect on the first program element having the safety classification.

The auxiliary program element may comprise instructions for the first program element to pause the execution until after the separate task finishes.

According to an embodiment, the method may further comprise a step of determining that the second program element does not have the safety classification.

Determining that the second program element does not have the safety classification may comprise comparing the second program element with a characteristic, said characteristic indicating a program element having the safety classification, or a program element not having the safety classification.

According to an example, determining that the second program element does not have the safety classification may comprise comparing the second program element with a list of program elements having the safety classification.

These techniques may allow to determine reliably and in an automated fashion that the second program element does not have the safety classification.

After generation of the modified program source code employing the techniques as described above, the modified program source code may be provided for compilation, in particular to a compiler unit of an industrial control process or environment.

The modified program source code, when run on an industrial controller unit, may prevent an undesired backlash of program elements not having the safety classification on the overall safety classification of the industrial control process.

In an embodiment, the method further comprises compiling the modified program source code, in particular by means of a compiler unit pertaining to an industrial controller unit.

According to an embodiment, the step of identifying the call to the second program element and/or generating the modified program source code and/or the determining that the second program element does not have the safety classification and/or providing the modified program source code for compilation and/or compiling the modified program source code is implemented automatically on a computing device, in particular on a compiler system for compiling the industrial control program. This allows for the safety classification of the industrial control program to be maintained even if the programmer, by chance or on purpose, mixes program elements having the safety classification with program elements not having the safety classification in his original program source code.

In a second aspect, the disclosure relates to a computer program or to a computer program product comprising computer-readable instructions, wherein the computer-readable instructions are adapted, when read on a computing device, to implement on the computing device a method with some or all of the features described above.

The computer program product may comprise a tangible storage medium storing the computer-readable instructions.

In a third aspect, the disclosure relates to a system for modifying an industrial control program, the industrial control program comprising a first program element having assigned a safety classification and a second program element not having assigned the safety classification, wherein the system comprises a code analysis unit adapted to identify, in program source code of the first program element, a call to the second program element, and a code modification unit adapted to generate a modified program source code, comprising to replace, in the program source code, the call to the second program element by an auxiliary program element, the auxiliary program element being compliant with the safety classification.

In some embodiments, the code analysis unit and/or the code modification unit may be implemented in hardware. In other examples, the code analysis unit and/or the code modification unit may be implemented in software. In some embodiments, the code analysis unit and/or the code modification unit may be implemented partly in hardware and partly in software.

In some embodiments, the code analysis unit and the code modification unit may be separate units. In other embodiments, the functionalities of the code analysis unit and the code modification unit may be integrated into a common unit.

The system may be adapted to implement a method with some or all of the features described above.

According to an embodiment, the system further comprises a determination unit adapted to determine that the second program element does not have the safety classification.

In an embodiment, the system further comprises a compiler unit adapted to compile the modified program source code.

In some embodiments, the determination unit and/or the compiler unit may be implemented in hardware. In other embodiments, the determination unit and/or the compiler unit may be implemented in software. In some embodiments, the determination unit and/or the compiler unit may be implemented partly in hardware and partly in software.

In an embodiment, the modified program source code comprises instructions for assigning data to a memory unit having a first memory area and a second memory area different and/or spatially separated from the first memory area, wherein the first program element having the safety classification pertains to the first memory area and the second program element not having the safety classification pertains to the second memory area.

DESCRIPTION OF EMBODIMENTS

The details and numerous advantages of the method and system according to the disclosure will be best understood from a description of preferred embodiments when read together with the accompanying drawings, in which.

Examples of a method and system for an industrial control program will now be described with reference to an exemplary industrial control environment to that involves control of a gantry crane 12 by means of industrial control software. However, this example is merely for illustration, and in general the techniques according to the present disclosure may be employed for the industrial control of any kind of industrial process, comprising but not limited to control of industrial machinery, robots, or chemical fabrication processes. Many of such processes have to fulfill operational safety requirements, such as requirements prescribed by law, government or industry regulation.

Figure 1:
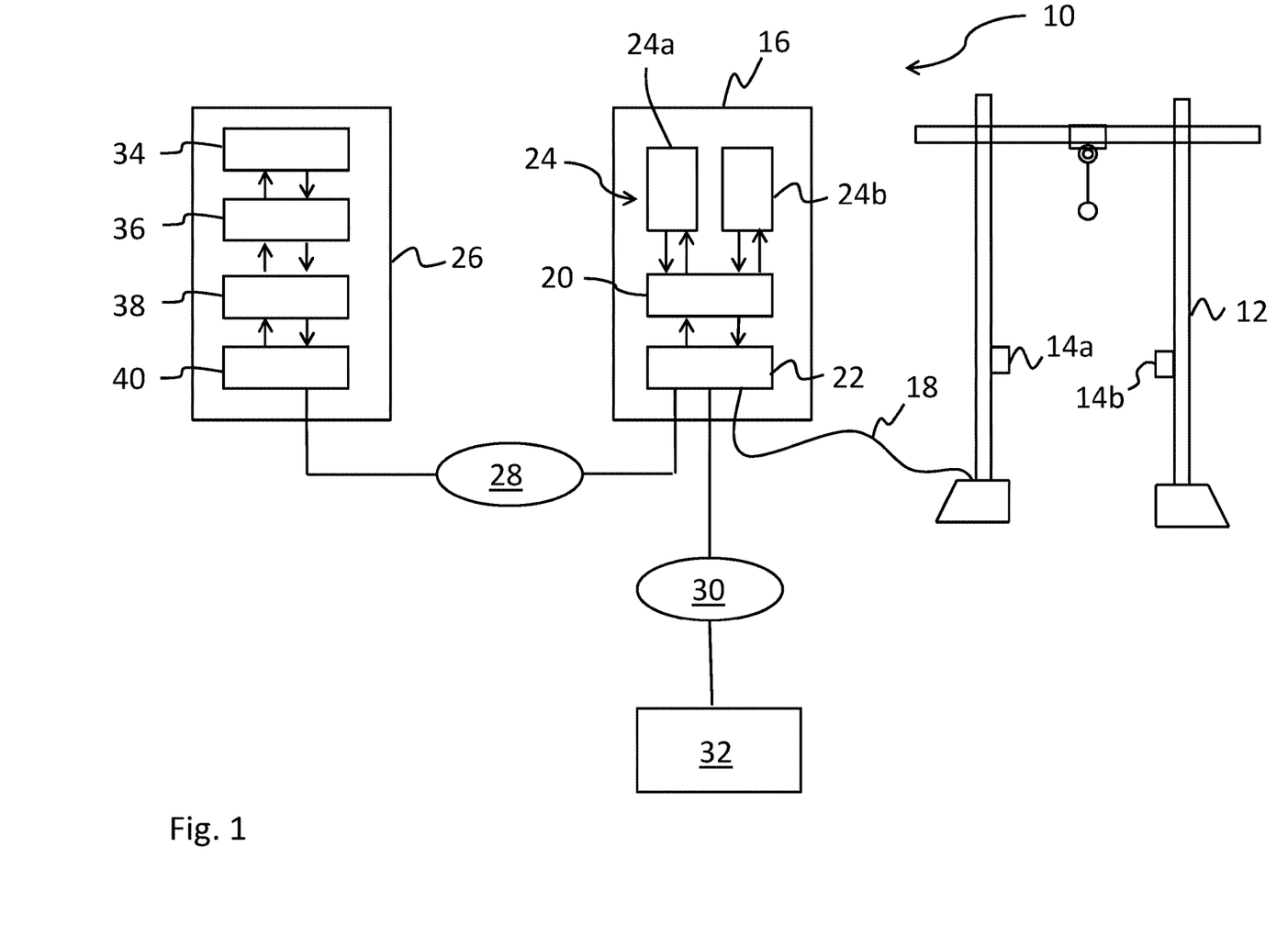
FIG. 1 is a schematic illustration of an industrial control environment in which a method and system according to an example may be employed.

As illustrated in FIG. 1, the industrial control environment to comprises the gantry crane 12, which may be a crane employed in a factory environment to move heavy goods in an assembly hall. Operation of the gantry crane 12 may pose potential hazards to humans working or moving in the vicinity of the gantry crane 12. The gantry crane 12 may therefore be equipped with a plurality of vicinity sensors 14a, 14b that may serve to detect the presence of a human in the area of operations of the gantry crane 12. In case the presence of a human is detected in the area of operations of the gantry crane 12, measures may need to be taken, as prescribed by industry regulation, to hold or pause operation of the gantry crane and/or move the gantry crane 12 to a safe operational state, which minimizes the risk of physical injury to the humans in the vicinity of the gantry crane 12.

If the gantry crane 12 is controlled by means of industrial control software, the industrial control software may monitor the vicinity sensors 14a, 14b, and may need to have provisions for performing these safety-related operations upon activation of the vicinity sensors 14a, 14b. Hence, the industrial control software may likewise need to require safety certification so that the machinery that it runs and controls, in our example the gantry crane 12, passes the certification requirements. For instance, requirements for safety certificates of industrial control software are laid down in specification IEC 61508 SIL2.

The industrial control environment to further comprises an industrial controller unit 16 that is connected to the gantry crane 12 by means of a control line 18, such as a wired or wireless connection. In other examples, the industrial controller unit 16 may be integrated into the controlled machinery, such as the gantry crane 12.

The industrial controller unit 16 may comprise a processing device 20, such as a CPU to run an industrial control program, such as in the form of a compiled program for controlling the gantry crane 12. To this end, the industrial controller unit 16 comprises a communication interface 22 that is connected to the processing device 20 and is adapted to communicate with the gantry crane 12 via the control line 18. For instance, the processing device 20 may provide instructions to the gantry crane 12 for operation of actuators or motors of the gantry crane 12 via the communication interface 22 and control line 18. The communication interface 22 may also receive sensor signals pertaining to an operation of the gantry crane 12 via the control line 18, and provide corresponding feedback to the processing device 20. For instance, such sensor signals may relate to safety-critical signals from the vicinity sensors 14a, 14b.

As further illustrated in FIG. 1, the industrial controller unit 16 also comprises a memory unit 24 connected to the processing device 20 and adapted to store programs, function blocks, functions, data or data structures pertaining to an operation of the industrial controller unit 16.

The industrial control environment 10 may further comprise a programming environment 26 that is connected to the communication interface 22 via a network 28, such as a factory intranet or the internet. For instance, the programming environment 26 may comprise a desktop PC or other computing device and may be employed by a programmer to design and generate industrial control software for the industrial controller unit 16, for instance in the form of a compiled control program. The compiled program may be transferred from the programming environment 26 to the industrial controller unit 16 via the network 28, and may be stored in the memory unit 24.

In a safety-sensitive environment, the industrial control program that a programmer designs may generally comprise program portions or elements that are relevant to the operational safety of the machinery, such as the gantry crane 12, and hence may need to fulfill or pass a safety classification. For instance, a first program element having a safety classification may relate to the operation of gathering signals from the vicinity sensors 14a, 14b, and generating corresponding control signals in response to the sensor signals to move the gantry crane 12 into a safe operation state in case the vicinity sensors 14a, 14b detect the presence of a human in the area of operations of the gantry crane 12.

However, other portions of the industrial control program may not be directly relevant to the operational safety of the gantry crane 12. For instance, in the industrial control environment 10 the industrial controller unit 16 may be further connected via the communication interface 22 and a network 30 to a server unit 32. For instance, the network 30 may be the internet, and the server unit 32 may be employed to remotely monitor operational data pertaining to an operation of the gantry crane 12. Alternatively or additionally, the server unit 32 may be employed as a licensing server to check that software licenses of software on the industrial controller unit 16 are up to date and running, such as at regular intervals or once the industrial controller unit 16 is started up. The server unit 32 may also provide means for communicating data between the industrial controller unit 16 and other industrial controller units (not shown) that may be operational in the industrial control environment 10. A second program element pertaining to such ancillary functions may not be relevant to the operational safety of the gantry crane 12, and hence may not need to have the safety classification. Such program elements do not require certification.

However, in order to guarantee operational safety of the gantry crane, measures should be in place to prevent any backlash of functionalities that do not have the safety classification on functionalities do that require the safety classification. For instance, backlash may be effectively avoided by providing separated memory areas and memory protection mechanisms, as described in additional detail below.

In general, an industrial control program, such as an industrial control program pertaining to the specification IEC 61131-3, comprises programs, function blocks, functions, global data and user-defined data types such as structures. Programs, function blocks and functions are sometimes collectively called program organization units (POU). Each such program element of an industrial control program may be safety-relevant, and hence may require special testing or certification. However, other program elements may not be directly safety relevant, and hence may not require the safety classification. In order to avoid any backlash of elements not having the safety classification on program elements having the safety classification, the programmer may want to follow a set of rules when programming the industrial control program. An exemplary set of rules may comprise the following provisions:

(a) A certified program organization unit and a certified data type may only comprise certified function blocks and certified data types as local declarations.
(b) A non-certified programming organization unit and a non-certified data type may only comprise non-certified function blocks and non-certified data types as local declarations.
(c) Safety-relevant global variables may not comprise non-certified data types as a type.
(d) Non-safety-relevant global variables may not have certified data types as a type.
(e) Certified programming organization units may access all data, both safety-relevant and non-safety-relevant data.
(f) Non-certified programming organization units may only read (but not write) safety-relevant data.
(g) Certified programming organization units may call certified and non-certified programming organization units.

(h) Non-certified programming organization units may only call non-certified programming organization units.

If a programmer follows these rules when writing the source code, a compiler may unambiguously distinguish between safety-relevant data and non-safety relevant data. For instance, the memory unit 24 of the industrial controller unit 16 may comprise a first memory area 24a pertaining to the safety classification and a second memory area 24b pertaining to data without the safety classification, wherein the first memory area 24a is distinct and spatially separated from the second memory area 24b. The programming environment 26 may provide a compiled program in which all safety-relevant data are allocated to the first memory area 24a, and all non-safety relevant data are allocated to the second memory area 24b. This may avoid a backlash of non-certified program elements on the safety-relevant data stored in the first memory area 24a.

Other sets of rules and memory protection may likewise be employed as an alternative to the example described above.

However, the risk of a mixture of program elements having the safety classification and program elements not having the safety classification and the need to follow a complex set of rules poses challenges for any programmer, in particular for an unexperienced programmer. This is particularly true given that industrial control programs are oftentimes complex and comprise a large number of programming organization units for different technical functions of an industrial machinery, as well as function calls within the industrial control program. Particularly critical is a call from a first program element having the safety classification to a second program element not having the safety classification, which may lead to an undetected and potentially detrimental backlash of an unsafe program element on a classified program element.

In order to address these challenges, and assist the programmer, the programming environment 26 according to the example allows to automatically identify, in program source code of the first program element having the safety classification, a call to the second program element not having the safety classification, and implicitly and automatically generate code that may replace the call to the second program element by an auxiliary program element, wherein the auxiliary program element is designed to be compliant with the safety classification.

With further reference to FIG. 1, the programming environment 26 comprises a programming unit 34, which a programmer may use as a tool to generate source code an industrial control program in a high-level programming language. The source code may be provided from the programming unit 34 to a code analysis unit 36, which may be adapted to identify, in program source code of the first program element having the safety classification, a call to the second program element not having the safety classification.

As can be further taken from FIG. 1, the programing environment 26 also comprises a code modification unit 38 that is adapted to generate a modified program source code, and replaces, in the program source code, the call to the second program element by an auxiliary program element, the auxiliary program element being compliant with the safety classification.

The programming environment 26 further comprises a compiler unit 40 which receives the thus-instrumented program code from the code modification unit 38 and compiles the modified program source code to provide a compiled industrial control program, which may be sent to the industrial controller unit 16 via the network 28.

Figure 2:
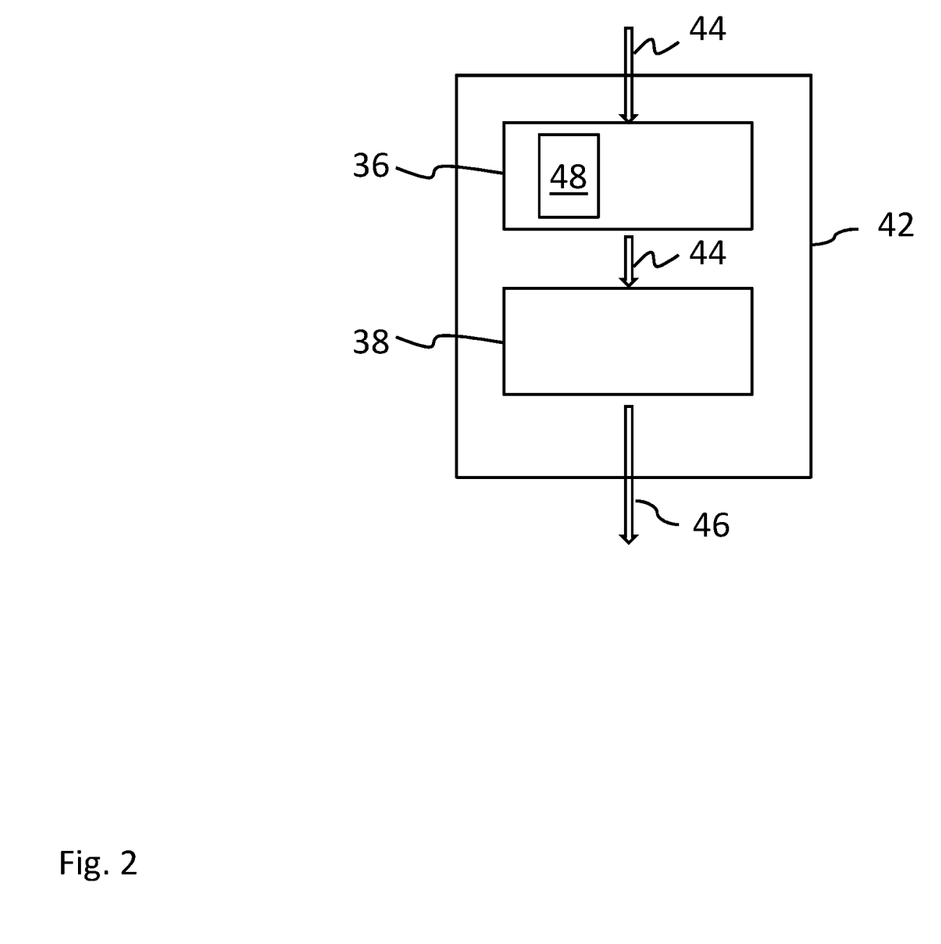
FIG. 2 is a schematic illustration of a system according to an example of the present disclosure.

FIG. 2 is an enlarged schematic view of a system 42 for modifying an industrial control program according to an example, comprising the code analysis unit 36 adapted to identify, in program source code 44 of the first program element having the safety classification, a call to the second program element not having the safety classification.

As further shown in FIG. 2, the system 42 additionally comprises the code modification unit 38 adapted to receive the program source code 44 of the first program element and to generate a modified program source code 46 compliant with the safety classification. In particular, the code modification unit 38 is adapted to replace, in the program source code 44, the call to the second program element by an auxiliary program element, the auxiliary program element being compliant with the safety classification.

The schematic illustration of FIG. 2 shows the code analysis unit 36 and the code modification unit 38 as separate units. However, in other examples, the code analysis unit 36 and the code modification unit 38 may be combined into a common unit. In particular, the code analysis unit 36 and/or the code modification unit 38 may be integrated into the compiler unit 40 of the programming environment 26.

As further illustrated in FIG. 2, the system 42 may optionally comprise a determination unit 48 adapted to determine that the second program element does not have the safety classification. In particular, the determination unit 48 may be integrated into the code analysis unit 36.

For instance, the determination unit 48 may be adapted to compare the second program element with a given list of program elements having the safety classification, or with a list of program elements not having the safety classification.

Figure 3:
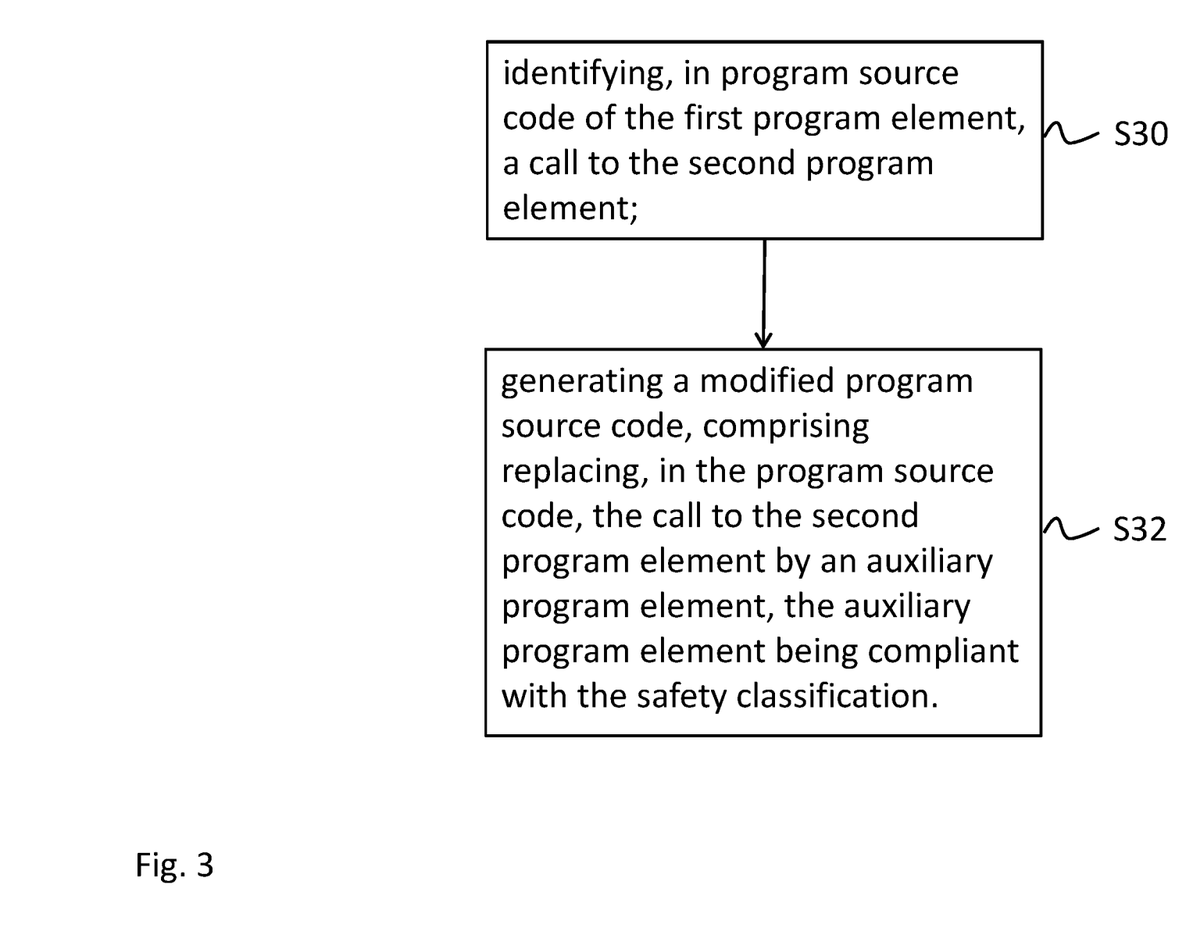
FIG. 3 is a flow diagram illustrating a method for modifying an industrial control program according to an example.

FIG. 3 is a flow diagram illustrating a method for modifying an industrial control program according to an example. The industrial control program may comprise a first program element having a safety classification and a second program element not having the safety classification.

In a first step S30, a call to the second program element is identified in program source code of the first program element.

In a second step S32, a modified program source code is generated, comprising replacing, in the program source code, the call to the second program element by an auxiliary program element, the auxiliary program element being compliant with the safety classification.

In an example, the code modification unit 38 may divert or reroute or redirect the call to the second program element by means of a wrapper function. In particular, the code modification unit 38 may replace the call to the second program element, such as a non-certified function, by a call to the auxiliary program element, such as an auxiliary function. For instance, the auxiliary function may receive as an input a pointer to the target function as well as a pointer to a list of arguments to be assigned to the target function.

The auxiliary function may provide for appropriate measures that protect the safety-relevant data in the first memory area 24a during execution of the program code not having the safety classification. In some examples, the auxiliary function can be implemented as a wrapper function, as will now be described with reference to FIGS. 4 to 6.

Figure 4:
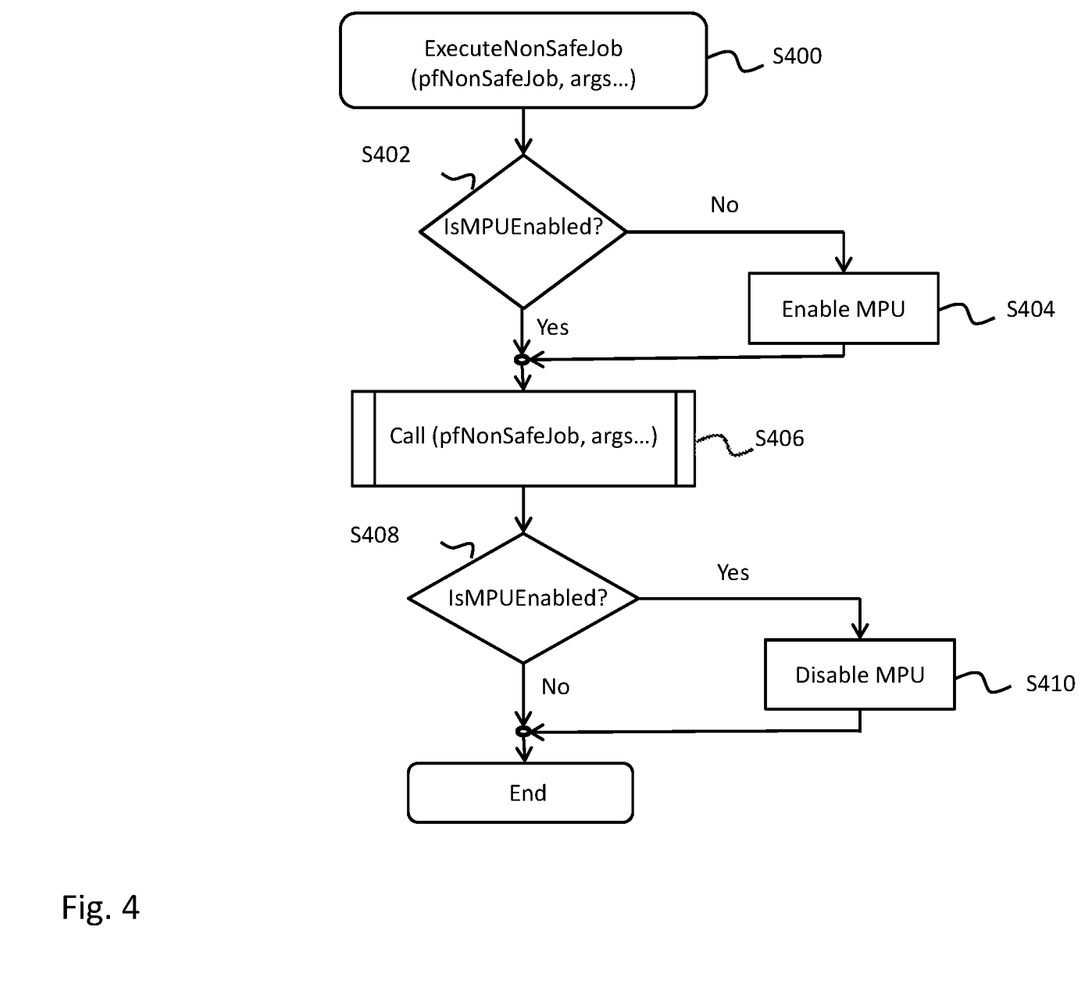
FIG. 4 is a flow diagram illustrating the workings of a wrapper function according to an example.

FIG. 4 is a schematic flow diagram illustrating the operation of a wrapper function and its consequences for the execution of the program code.

A call to the second element "NonSafeJob" not having the safety classification triggers execution of the auxiliary function "ExecuteNonSafeJob" in step S400.

The auxiliary function "ExecuteNonSafeJob" checks in step S402 whether a memory protection unit (MPU) is enabled. For instance, the memory protection unit MPU may be adapted to implement a hardware lock, such as a hardware lock on memory in the first memory area 24a having the safety classification.

If the memory protection unit is not already enabled, the auxiliary function enables the memory protection unit in step S404.

Once the memory protection unit is enabled, the auxiliary function calls the second program element not having the safety classification, such as the function "NonSafeJob" with corresponding arguments in step S406. Given that the memory protection is in place, any undesired backlash on program elements having the safety classification is effectively and automatically prevented.

Once the function "NonSafeJob" has been executed, the auxiliary function checks in step S406 whether the memory protection unit is still enabled, and, if so, disables the memory protection unit in step S410. This completes the wrapper function.

In some examples, the implementation of a memory lock may not be desired or necessary, or may be unfeasible. In these examples, it may be sufficient to detect that certified data have been modified by means of non-certified code, so that appropriate countermeasures may be taken. For instance, if a backlash of non-certified code on certified data is detected, the controlled industrial system, such as the gantry crane 12, may be switched into a safe default state.

Figure 5:
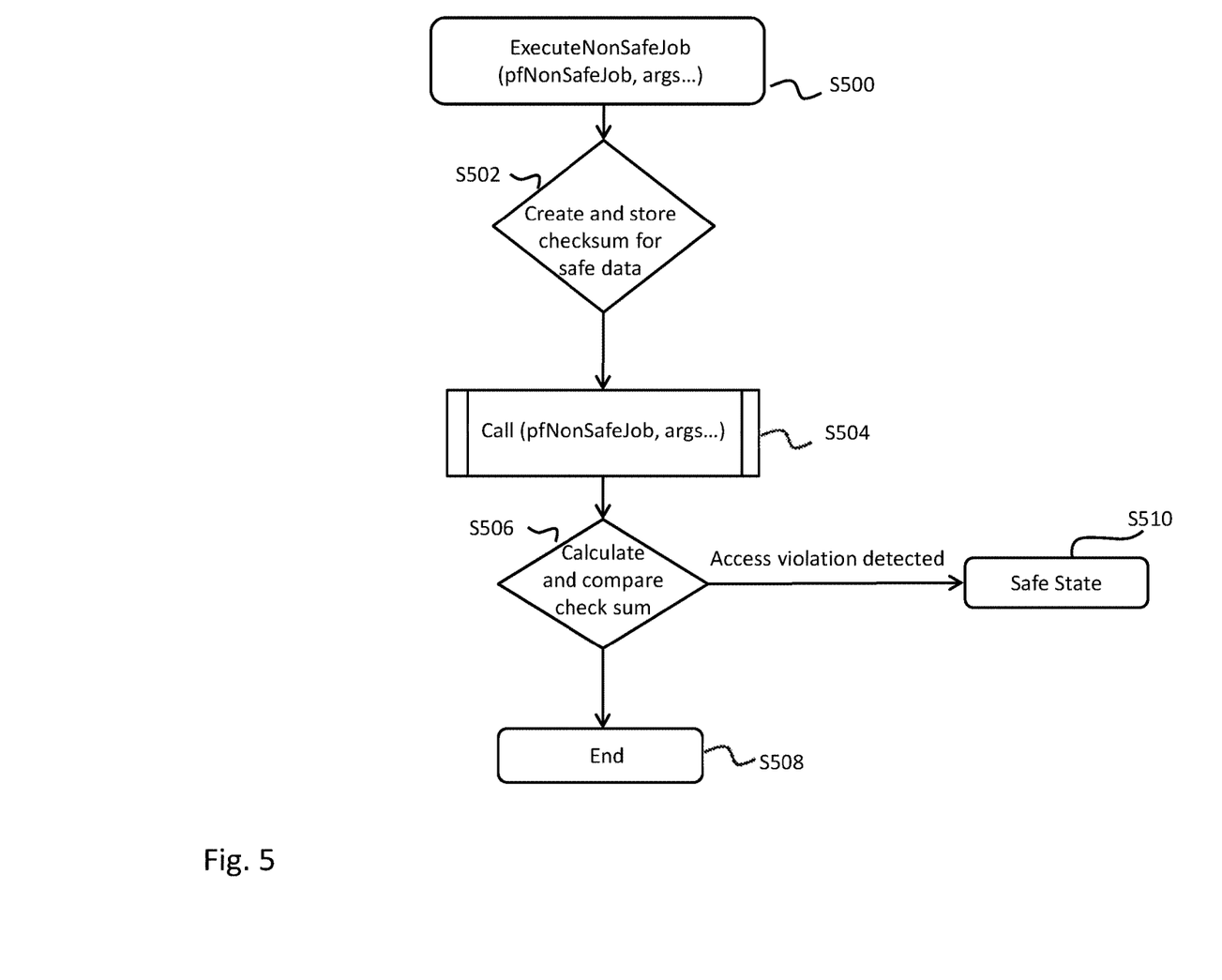
FIG. 5 is a flow diagram illustrating the workings of a wrapper function according to another example.

In an example, the auxiliary function implements a check sum analysis of the data in the first memory area 24a having the safety classification before the second program element not having the safety classification is executed. Once the second program element has been executed, the auxiliary function checks whether the check sum of the data in the first memory area 24a is unchanged.

A corresponding flow diagram is schematically illustrated in FIG. 5.

In a first step S500, the auxiliary function "ExecuteNonSafeJob" is called in response to a detected call to a non-certified function "NonSafeJob", and computes and stores a check sum across all the data in the first memory area 24a in step S502.

Once the check sum has been computed in step S502, the second program element not having the safety classification, such as the function "NonSafeJob" is executed in step S504.

Once the function in "NonSafeJob" has been executed, the auxiliary function recalculates the check sum of the data stored in the first memory area 24a having the safety classification and compares it to the initial check sum in step S506.

If no deviation is detected, the auxiliary function ends in step S508, and the program execution leaves the wrapper and returns to the original code.

If, however, a memory access violation is detected in step S506, the industrial controller unit 16 provides a signal to the gantry crane 12 in step S510 to switch the gantry crane 12 into a default operational state in which the health risk for humans in the operating area of the gantry crane 12 is minimized. As part of the step S510, the industrial controller unit 16 may also alert an operator of the malfunction, such as via the server unit 32.

Figure 6:
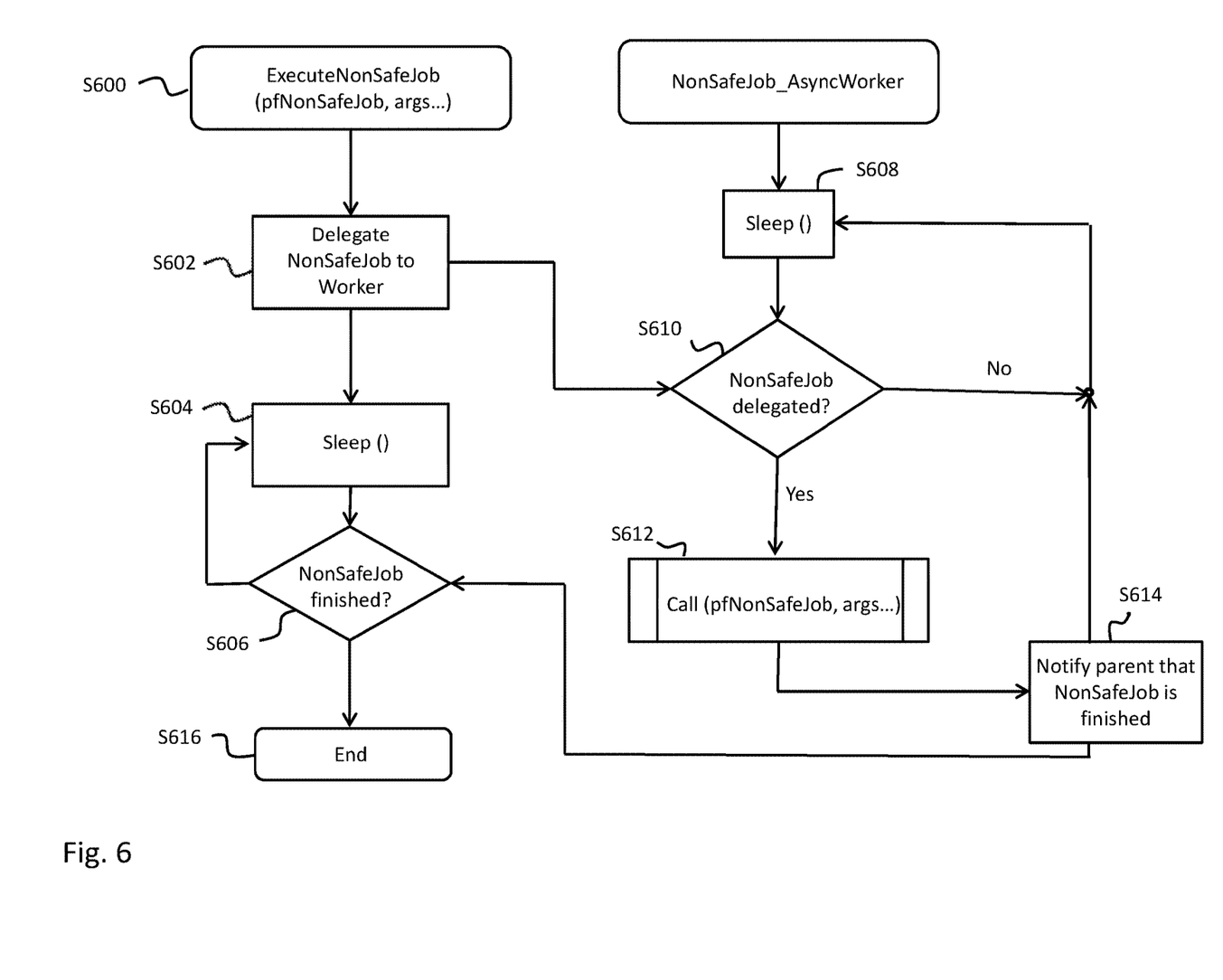
FIG. 6 is a flow diagram illustrating the workings of a wrapper function according to another example.

In some examples, an underlying operating system may not support a switching of a memory protection configuration, but may have provisions for memory protection per task, process or thread. In these configurations, the auxiliary function, such as the wrapper function, may delegate the execution of non-certified code to another task, process, or thread with limited write access. This may also effectively prevent backlash on certified data.

A corresponding wrapper function is schematically illustrated in FIG. 6.

In a first step Shoo, the auxiliary function "ExecuteNonSafeJob" is called in response to a detected call to a non-certified function "NonSafeJob".

The auxiliary function delegates the non-certified function "NonSafeJob" to a different process in step S602, such as a separate child or worker process, and subsequently enters a sleep mode or idle mode in step S604. In the sleep mode or idle mode, the parent function "NonSafeJob" waits in step S606 for a signal indicating that the separate worker process has been finished.

The separate worker process "NonSafeJob_AsyncWorker" is generally in a sleep mode in step S608, and awakes in step S610 when the function "NonSafeJob" is delegated to it by the auxiliary function. The separate worker process then calls the second function "NonSafeJob" in step S612. Given that the separate worker process has no write access rights to the first memory area 24a having the safety classification, a backlash on the certified data is efficiently prevented.

Once the worker process has executed the function "NonSafeJob", it notifies the auxiliary function in step S614.

Upon receipt of the notification in step S606, the auxiliary function terminates the sleep mode and returns to the original program in step S616.

The techniques according to the disclosure may be employed to ensure that noncertified program code does not backlash on certified program code.

In particular, the techniques of the present disclosure may be implemented in a safety extension for the compiler unit 40 that automatically identifies and decouples calls of non-certified program elements and establishes an effective memory protection using the techniques described above.

The same considerations apply to initialization code, i.e., code that may be used to set the industrial controller unit 16 and/or the industrial control process, such as the gantry crane 12 to an operating state during a loading or initialization phase. This may involve the call of constructors, data initializing and other functions, of which some may involve non-certified program code. The safety extension may identify and decouple the noncertified implicit initialization code by calling the wrapper function "ExecuteNonSafeJob" using the techniques described above.

The examples and the Figures merely serve to illustrate the method and system according to the disclosure, but should not be understood to imply any limitation. The scope of the disclosure is to be determined by means of the appended claims.

REFERENCE SIGNS

10 industrial control environment
12 gantry crane
14a, 14b vicinity sensors
16 industrial controller unit
18 control line
20 processing device
22 communication interface
24 memory unit
24a first memory area having a safety classification 24b second memory area not having a safety classification
26 programming environment
28 network
30 network
32 server unit
34 programming unit
36 code analysis unit
38 code modification unit
40 compiler unit
42 system for modifying an industrial control program
44 program source code
46 modified program source code
48 determination unit

What is claimed is:

1. A method for modifying an industrial control program, the industrial control program comprising a first program element having a safety classification and a second program element not having the safety classification, the method comprising:
    identifying, in program source code of the first program element, a call to the second program element; and
    generating a modified program source code, comprising replacing, in the program source code, the call to the second program element by an auxiliary program element, the auxiliary program element being compliant with the safety classification.

2. The method according to claim 1, wherein the auxiliary program element comprises instructions for preventing or delaying or modifying an execution of the second program element.

3. The method according to claim 1, wherein generating the modified program source code comprises replacing the call to the second program element by a wrapper function, the wrapper function being adapted to call the auxiliary program element.

4. The method according to claim 1, wherein the auxiliary program element comprises instructions for a memory protection.

5. The method according to claim 1, wherein the auxiliary program element comprises instructions for a memory analysis.

6. The method according to claim 5, wherein the auxiliary program element comprises instructions for switching an industrial control process controlled by the industrial control program to a default state in response to the memory analysis.

7. The method according to claim 1, wherein the auxiliary program element comprises instructions for delegating an execution of the second program element to a separate task.

8. The method according to claim 7, wherein the auxiliary program element further comprises instructions for delaying an execution of the first program element until the separate task finishes.

9. The method according to claim 1, further comprising:
    determining that the second program element does not have the safety classification.

10. The method according to claim 1, wherein the auxiliary program element comprises instructions for a memory lock.

11. The method according to claim 1, wherein the auxiliary program element comprises instructions for a memory analysis of a memory area exclusive to program elements having the safety classification.

12. The method according to claim 1, wherein the auxiliary program element comprises instructions for delegating an execution of the second program element to a task having the safety classification or associated memory.

13. A computer program comprising computer-readable instructions stored in a non-transitory storage, wherein the computer-readable instructions are adapted, when executed on a computing device, to implement on the computing device a method for modifying an industrial control program, the industrial control program comprising a first program element having a safety classification and a second program element not having the safety classification, the method comprising:
    identifying, in program source code of the first program element, a call to the second program element; and
    generating a modified program source code, comprising replacing, in the program source code, the call to the second program element by an auxiliary program element, the auxiliary program element being compliant with the safety classification.

14. A system for modifying an industrial control program, the industrial control program comprising a first program element having a safety classification and a second program element not having the safety classification, the system comprising:
    a code analysis unit adapted to identify, in program source code of the first program element, a call to the second program element; and
    a code modification unit adapted to generate a modified program source code, comprising to replace, in the program source code, the call to the second program element by an auxiliary program element, the auxiliary program element being compliant with the safety classification.

15. The system according to claim 14, wherein the system is adapted to implement a method according to claim 1.

16. The system according to claim 14, further comprising:
    a determination unit adapted to determine that the second program element does not have the safety classification.

17. The system according to claim 14, further comprising:
    a compiler unit adapted to compile the modified program source code.

18. The system according to claim 14, wherein the modified program source code comprises instructions for assigning data to a memory unit having a first memory area and a second memory area different and/or spatially separated from the first memory area, wherein the first program element having the safety classification pertains to the first memory area and the second program element not having the safety classification pertains to the second memory area.

* * * * *